(12) United States Patent
Onuma

(10) Patent No.: US 6,192,308 B1
(45) Date of Patent: Feb. 20, 2001

(54) BRAKE CONTROL DEVICE OF VEHICLE OPERABLE WITH DOUBLE CHECKING OF DRIVER'S POSITIVE BRAKING INTENTION

(75) Inventor: Yutaka Onuma, Susono (JP)

(73) Assignee: Toyota Jidosha Kabushikii Kaisha, Toyota (JP)

( * ) Notice: Under 35 U.S.C. 154(b), the term of this patent shall be extended for 0 days.

(21) Appl. No.: 09/436,252

(22) Filed: Nov. 9, 1999

(30) Foreign Application Priority Data

Dec. 17, 1998 (JP) .................................................. 10-359426

(51) Int. Cl.[7] ................................ B60T 13/74; B60T 8/44
(52) U.S. Cl. ...................... 701/70; 303/113.2; 303/113.4; 303/139; 303/12; 180/244; 180/197
(58) Field of Search ..................... 701/70, 78; 303/113.2, 303/92, 113.4, 139, 12; 364/426.02; 60/535; 180/244, 197

(56) References Cited

U.S. PATENT DOCUMENTS

| | | | |
|---|---|---|---|
| 5,019,985 | * | 5/1991 | Yasuno et al. .................. 364/426.02 |
| 5,201,573 | * | 4/1993 | Leiber et al. ........................... 303/92 |
| 5,217,284 | * | 6/1993 | Willmann ........................... 303/113.2 |
| 5,350,225 | * | 9/1994 | Steiner et al. ..................... 303/113.4 |
| 5,433,512 | * | 7/1995 | Aoki et al. ................................ 303/3 |
| 5,450,324 | * | 9/1995 | Cikanek ........................... 364/426.02 |
| 5,496,099 | * | 3/1996 | Resch ................................ 303/114.1 |
| 5,586,814 | * | 12/1996 | Steiner ............................... 303/116.2 |
| 5,727,852 | * | 3/1998 | Pueschel et al. .................. 303/113.4 |
| 5,853,229 | * | 12/1998 | Willmann et al. ........................ 303/3 |

FOREIGN PATENT DOCUMENTS

| | | |
|---|---|---|
| 4-243655 | 8/1992 | (JP) . |
| 9-175222 | 7/1997 | (JP) . |

* cited by examiner

Primary Examiner—William A. Cuchlinski, Jr.
Assistant Examiner—Tuan To
(74) Attorney, Agent, or Firm—Oliff & Berridge, PLC

(57) ABSTRACT

In controlling the operation of a powered brake system of a vehicle in which wheel cylinders of the brake system are supplied with brake fluid compressed by a motor powered pump under a control of an electric controller according to a stroke of depression of a brake pedal by a driver detected by a brake depression stroke sensor and a master cylinder pressure generated by the brake depression detected by a master cylinder pressure sensor, a brake control device makes a double checking if the depression stroke detected by the sensor exceeds a predetermined threshold value, and also if the brake pedal is depressed at least for a predetermined stroke detectable by a stroke limit switch, before starting the operation of the powered brake system. When the stroke limit switch has failed, instead, the brake control device checks if the master cylinder pressure increases to a predetermined value to start the operation of the powered brake system with an initial biasing reduction of the starting brake force.

4 Claims, 8 Drawing Sheets

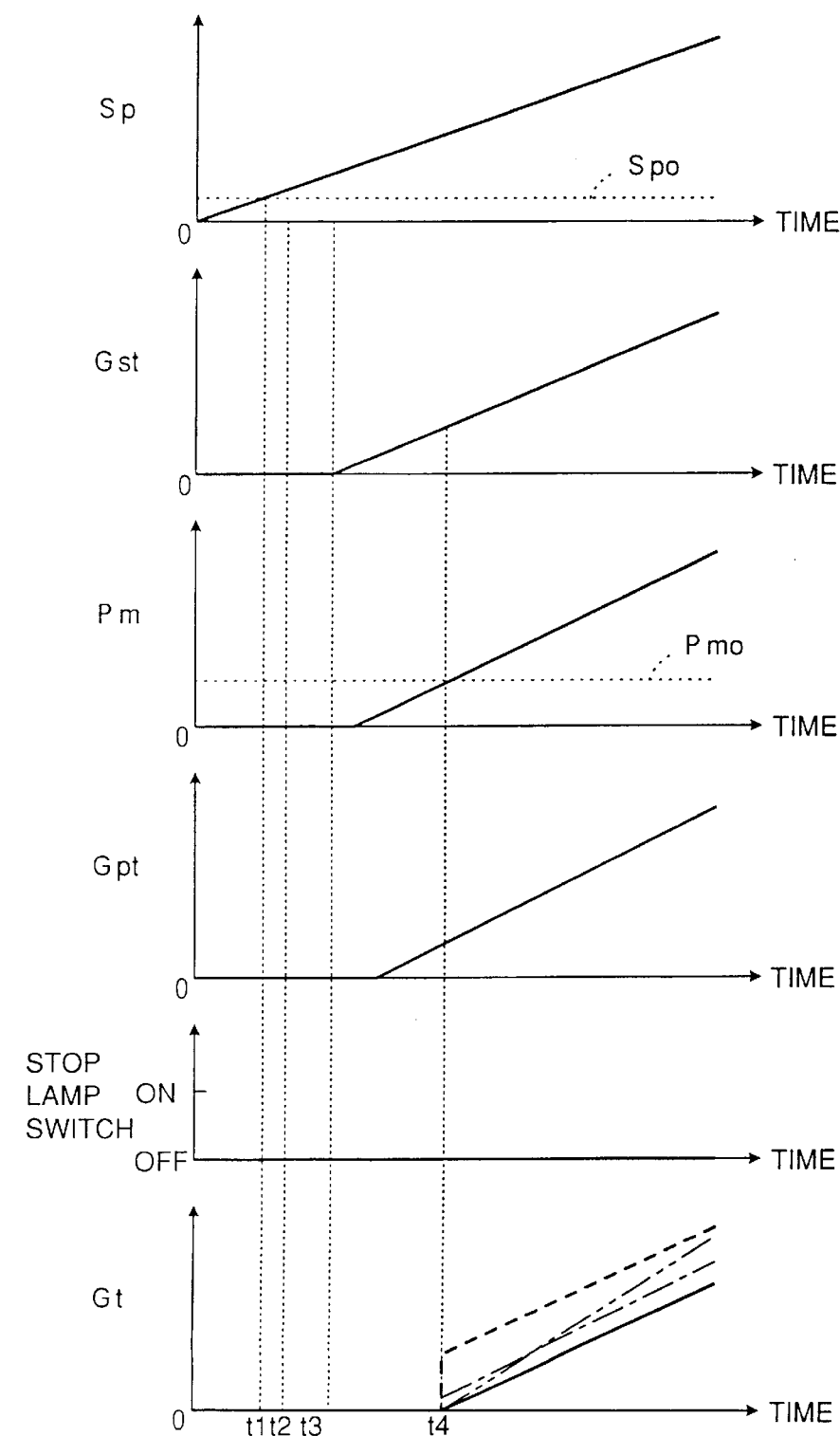

BRAKE CONTROL DEVICE OF VEHICLE OPERABLE WITH DOUBLE CHECKING OF DRIVER'S POSITIVE BRAKING INTENTION

BACKGROUND OF THE INVENTION

1. Field of the Invention

The present invention relates to a brake system of a vehicle, and more particularly, to a brake control device for a vehicle brake system which operates with motor powered pump in response to a depression of the brake pedal by a driver.

2. Description of the Prior Art

An art of powered brake system of vehicles such as automobiles is already known, in which the wheel cylinders of a vehicle are selectively supplied with a brake fluid pressurized by a motor powered pump under a control of electric control means which calculate and determine the pressure of the brake fluid to be supplied to each selected one or ones of the wheel cylinders based upon a depression of the brake pedal by a driver so that a more powerful and more ingeniously controlled braking is applied to the wheels than the braking simply dependent upon a compression of the brake fluid in the master cylinder effected by a depression of the brake pedal by a driver.

An example of such a powered brake system is shown in, for example, Japanese Patent Laid-open Publication 9-30394 based upon German Patent Application 19526659.5 according to which a target deceleration of a vehicle is calculated based upon a pressure of the master cylinder and its change rate, whereby the braking force is controlled to attain a deceleration of the vehicle conforming to the target deceleration. It will be expected that such a control of the braking force based upon the master cylinder pressure and its change rate provides a better braking performance than the conventional hydraulic brake system dependent only upon the master cylinder pressure generated by a depression of the brake pedal.

However, the increase of the master cylinder pressure according to a depression of the brake pedal generally shows such a performance as shown in FIG. 7 that the master cylinder pressure starts to increase only after the brake pedal depression force increases beyond a certain initial idle region, thereby causing an insensible initial region in which the driver's intention for a deceleration of the vehicle is not appropriately read out from the master cylinder pressure.

On the other hand, there is generally such a relationship between the stroke and the force of depression of the brake pedal as shown in FIG. 8, in which, although there is a certain initial idle stroke which can proceed with no reaction of pedal depression, if the initial idle stroke is provisionally taken into consideration, there is no region of initial insensibleness in reading out the driver's intention for a deceleration of the vehicle from the stroke of depression of the brake pedal. Indeed, in driving vehicles, mostly cars, drivers will often step on the brake pedal for a precaution of braking within a depth which corresponds to the intercept of the performance curve of FIG. 8 along the ordinate, generating no reaction force of depression. Although the amount of such a precautionary depression itself is irregular and indefinite, it does not, in any event, affect the running of the vehicle at all, and if the stroke of depression proceeds so far as to cause any pedal depression force indicating an actual intention of the driver for a deceleration of the vehicle, the driver's intention for the deceleration of the vehicle is immediately readable from the stroke with no initial insensibleness.

Further, since the curve of pedal depression stroke vs. pedal depression force taken respectively along an ordinate and an abscissa of rectangular coordinates generally shows such a convex shape as shown in FIG. 8 having a relatively steep slope in the initial region of the depression, the driver's intention for a deceleration of the vehicle is detectable at a high precision in a low braking region by checking the pedal depression stroke, although the precision swiftly substantially lowers when the pedal depression increases.

In consideration of such particular characteristics as described above of the relationship between the master cylinder pressure and the depression force of the brake pedal and the relationship between the depression stroke and the depression force of the brake pedal, the present inventor has proposed, together with his college, an invention with regard to a brake control device for a powered brake system of a vehicle by U.S. patent application Ser. No. 09/263,226, which estimates a braking force to be applied to the wheels of the vehicle in response to the operation of the brake pedal by a driver in such a manner that the inefficiency due to the initial insensibleness of the master cylinder pressure to the brake depression force is obviated, while the high sensitivity of the brake pedal depression stroke to the brake depression force in the initial stage of the brake depression is effectively utilized.

Indeed, in more detail, the above-mentioned formerly proposed brake control device adapted to be incorporation into a vehicle having wheels and a brake system for the wheels including wheel cylinders for applying a braking force to each corresponding one of the wheels according to a supply of a pressurized brake fluid thereto, a brake pedal adapted to be depressed by a driver, a master cylinder adapted to compress the brake fluid according to a depression of the brake pedal by the driver, a motor powered pump for pressurizing the brake fluid, and control means including on-off valves for controlling supply of the brake fluid pressurized by the master cylinder and the brake fluid pressurized by the pump to the wheel cylinders, comprises:

means for detecting a stroke of the depression of the brake pedal, means for detecting a pressure of the brake fluid compressed by the master cylinder, and means for determining a pressure of the brake fluid supplied to a selected one or ones of the wheel cylinders under a control of the control means so as to be increased along with increase of the depression stroke of the brake pedal as well as increase of the master cylinder pressure by laying first and second weights on the increase of the brake pedal depression stroke and the increase of the master cylinder pressure, respectively, the first weight being decreased while the second weight being increased relative to one another along with increase of the total target deceleration.

The last paragraph of the above-mentioned former invention means, in more detail, that the brake fluid pressure determination means determine the brake fluid pressure supplied to the selected one or ones of the wheel cylinders to accomplish a deceleration Gt which is a weighted sum of Gst and Gpt such as $$Gt = (1-\alpha)Gst + \alpha Gp,$$

wherein Gst is a target deceleration scheduled to increase along with increase of depression stroke Sp of the brake pedal as shown in FIG. 9, while Gpt is a target deceleration scheduled to increase along with increase of master cylinder pressure Pm as shown in FIG. 10, and the weighting factor α is such a value which is scheduled to change along with the total deceleration Gt as shown in FIG. 11.

By the pressure of the brake fluid supplied to the wheel cylinders being determined according to a weighted combination of a first braking effect corresponding to the brake pedal depression stroke and a second braking effect corresponding to the master cylinder pressure so that the weight is shifted from the first braking effect to the second braking effect along with increase of the total target deceleration or the total braking force, the initial insensibleness of the brake control based upon the detection of the master cylinder pressure is compensated for by the high sensibleness of the brake control based upon the brake pedal depression stroke, while such a compensation is gradually cancelled according to increase of the braking force out of the initial insensible region, so that a desirable linearity is obtained in the relationship between the braking force applied to the wheels and the reaction force perceived by the driver against the depression of the brake pedal.

SUMMARY OF THE INVENTION

As will be noted in the hydraulic circuit of such a semi-automatic brake system as shown in FIG. 1A of the above-mentioned former application and also in FIG. 1A of the present application described hereinbelow, which is the same as FIG. 1A of the former application, the semi-automatic brake system, i.e. the powered brake system, operates in a kind of digital manner such that, when one of the wheels is applied with a controlled braking, a changeover type normally closed on-off valve (inlet valve) provided between a motor powered brake fluid pressure source and the wheel cylinder of the one wheel is selectively digitally opened (made to be through), while a similar changeover type normally open on-off valve (outlet valve) provided between the one wheel cylinder and a drain reservoir of the brake fluid is selectively digitally closed (made to be blocked), so that a certain controlled brake fluid pressure is supplied to the wheel cylinder as a result of the balance of an integrated open period of the inlet valve and an integrated closed period of the outlet valve. In other words, such a semi-automatic brake system can not be borderlessly put into operation from a non-operating condition like the primitive hydraulic brake system in which a wheel cylinder is directly connected with a master cylinder. Such a semi-automatic brake system needs certain means for determining whether to operate or not to operate itself.

Therefore, it is contemplated that the operating performance of such a semi-automatic brake system could be improved with respect to the determination of whether to operate or not to operate according to a depression of the brake pedal by a driver.

In view of the above, it is a primary object of the present invention to provide a brake control device for such a semi-automatic brake system in which an improvement is incorporated with regard to the determination of the operation thereof according to a depression of the brake pedal by a driver.

In order to accomplish such a primary object, the present invention proposes: a brake control device of a vehicle having wheels and a brake system for the wheels including wheel cylinders for applying a braking force to each corresponding one of the wheels according to a supply of a pressurized brake fluid thereto, a brake pedal adapted to be depressed by a driver, a master cylinder adapted to generate a master cylinder pressure which increases along with increase of the depression of the brake pedal by the driver, a motor powered pump for pressurizing the brake fluid, and control means including on-off valves for selectively supplying the brake fluid pressurized by the pump to selected one or ones of the wheel cylinders, the brake control device comprising:

means for detecting a stroke of the depression of the brake pedal, means for detecting the brake pedal to be depressed at least for a predetermined initial stroke, means for detecting a pressure value of the master cylinder pressure, first judgment means for judging the brake depression stroke detected by the brake pedal depression stroke detection means to increase beyond a predetermined threshold value smaller than the initial stroke predetermined for the initial brake pedal stroke detection means as a first positive braking intention of the driver, second judgment means for judging the brake pedal to be depressed at least for the initial stroke as a second positive braking intention of the driver, means for determining the brake system to operate such that the brake fluid pressurized by the motor powered pump is supplied to at least one selected from the wheel cylinders under a control of the control means when the first judgment means judge the first positive braking intention of the driver, while the second judgment means judge the second positive braking intention of the driver, wherein the control means control a pressure of the brake fluid supplied to the selected one of the wheel cylinders such that the vehicle is more decelerated along with increase of the depression stroke of the brake pedal and increase of the master cylinder pressure by laying first and second weights on the increase of the depression stroke and the increase of the master cylinder pressure, respectively, the first weight being decreased while the second weight being increased relative to one another along with increase of the braking applied to the vehicle.

By such a construction that the operation of the semi-automatic brake system is determined basically according to a double checking that the first judgment means for judging the brake depression stroke detected by the brake pedal depression stroke detection means to increase beyond a threshold value predetermined therefor judge a first positive braking intention of the driver, while the second judgment means for judging the brake pedal to be depressed at least for the initial stroke judge a second positive braking intention of the driver, the appropriateness of the starting of the operation of the semi-automatic brake system in reflection of the deliver's intention for braking is enhanced than in starting the operation of the semi-automatic brake system simply according to the detection of the first judgment means for judging the brake depression stroke detected by the brake pedal depression stroke detection means to increase beyond the predetermined threshold value.

Since the means for detecting the brake pedal to be depressed at least for a predetermined initial stroke will generally be constructed to be much simpler in construction than the means for detecting a stroke of the depression of the brake pedal over a wide stroke range, it will be more precisely available by such second judgment means to judge that the brake pedal was depressed for a predetermined initial stroke. Therefore, when it is so arranged that the operation of the semi-automatic brake system is started by the second judgment means judging the start of operation under the condition that the first judgment means already judge the start of operation, the moment of starting the operation of such a semi-automatic brake system will be determined more precisely, while definitely confirming the normal operation of the brake pedal depression stroke detection means and the first brake pedal depression stroke judgment means.

As a modification of the present invention, the brake control device of the above-mentioned basic construction may further comprise:

third judgment means for judging the master cylinder pressure to increase beyond a threshold value predetermined therefore as a third positive braking intention of the driver, means for storing an initial value of the stroke detected by the stroke detection means at a moment when the brake system operation determination means determine the operation of the brake system, and means for storing an initial value of the master cylinder pressure value detected by the master cylinder pressure value detection means at the moment when the brake system operation determination means determine the operation of the brake system, wherein the brake system operation determination means determine the operation of the brake system when the first judgment means judge the first positive braking intention of the driver, while the third judgment means judge the third positive braking intention of the driver, even when the second judgment means do not judge the second positive braking intention of the driver, and wherein the control means control a pressure of the brake fluid supplied to the selected one of the wheel cylinders such that the vehicle is more decelerated along with increase of the depression stroke of the brake pedal above the initial stroke value and increase of the master cylinder pressure above the initial mater cylinder pressure value by laying the first and second weights on the increase of the depression stroke and the increase of the master cylinder pressure, respectively, the first weight being decreased while the second weight being increased relative to one another along with increase of the braking applied to the vehicle.

According to the above-mentioned modification, the start of the operation of the semi-automatic brake system is determined according to a double checking of the first positive braking intention of the driver judged based upon the brake pedal depression stroke detected by the brake pedal depression stroke detection means and the third positive braking intention of the driver judged based upon the master cylinder pressure detected by the master cylinder pressure detection means.

In this case, however, as will be noted from a comparison of FIGS. 7 and 8, there is a substantial delay for the third judgment means to judge the master cylinder pressure to increase beyond the threshold value predetermined therefor as compared with the first judgment means to judge the brake depression stroke detected by the brake pedal depression stroke detection means to increase beyond the threshold value predetermined therefor. Therefore, when the semi-automatic brake system is started to operate by the third judgment means judging the master cylinder pressure to increase beyond the predetermined threshold value, the brake pedal depression stroke will be already at a substantial value.

Therefore, it is guessed that a target value for the braking control such as the target deceleration Gst scheduled for the brake pedal depression stroke is already at a substantial level at the moment when the start of the operation of the semi-automatic brake system is determined based upon the judgment of the third judgment means.

On the other hand, as shown in FIG. 10, a braking effect such as the target deceleration Gpt scheduled according to the master cylinder pressure Pm rises up at a substantial rate from the very beginning along with increase of the master cylinder pressure.

Therefore, if the semi-automatic brake system was put into operation according to the judgment of the third judgment means, the semi-automatic brake system would be impulsively started with a steppedly increased substantial value of the target deceleration from the very beginning.

However, since the above modified construction comprises the means for storing an initial value of the stroke detected by the stroke detection means at a moment when the brake system operation determination means determine the operation of the brake system, and the means for storing an initial value of the master cylinder pressure value detected by the master cylinder pressure value detection means at the moment when the brake system operation determination means determine the operation of the brake system, while the control means operate with such an increase of the depression stroke of the brake pedal that is above the initial stroke value and also such an increase of the master cylinder pressure that is above the initial mater cylinder pressure value, the above-mentioned impulsive braking at the starting of the operation of the semi-automatic brake system according to the third judgment means is avoided.

The same effect of avoiding such an impulsive braking at the starting of the operation of the semi-automatic brake system according to the third judgment means is also available by such another modification that the control means calculate an initial target deceleration at a moment when the brake system operation determination means determine the operation of the brake system, and control a pressure of the brake fluid supplied to the selected one of the wheel cylinders such that the vehicle is more decelerated less for the initial target deceleration along with increase of the depression stroke of the brake pedal and increase of the master cylinder pressure by laying first and second weights on the increase of the depression stroke and the increase of the master cylinder pressure, respectively, the first weight being decreased while the second weight being increased relative to one another along with increase of the braking applied to the vehicle.

For executing the above modifications, the brake system operation determination means may determine the operation of the brake system when the first judgment means judge the first positive braking intention of the driver, while the third judgment means judge the third positive braking intention of the driver, even when the second judgment means do not judge the second positive braking intention of the driver.

BRIEF DESCRIPTION OF THE DRAWINGS

In the accompanying drawing,

FIGS. 5A–5F are a set of graphs similar to those of FIGS. 4A–4F, showing a change which occurs in the performances of some parameters due to a failure of a part thereof;

DESCRIPTION OF THE PREFERRED EMBODIMENT

In the following, the present invention will be described in more detail with respect to a preferred embodiment thereof and its modification by referring to the accompanying drawings.

Figure 1A:
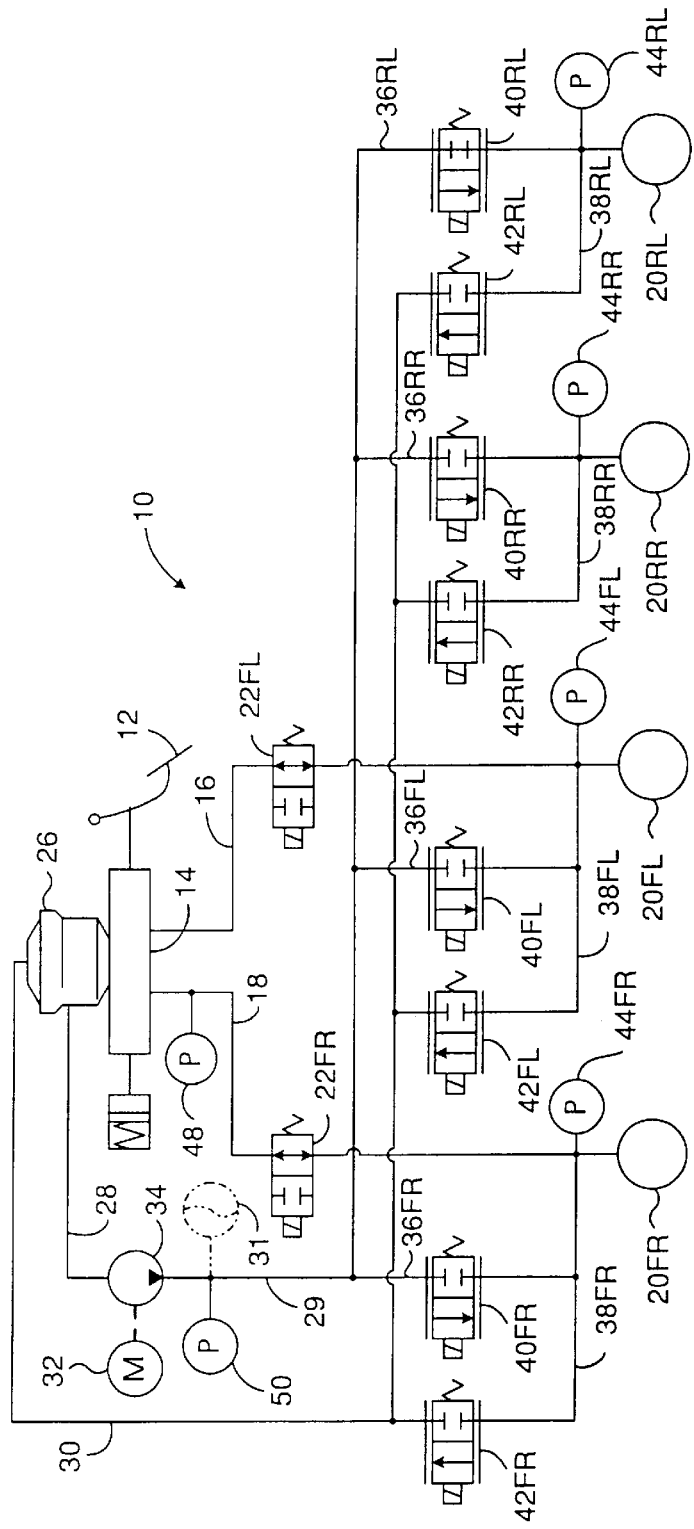
FIG. 1A is a diagram showing an example of the hydraulic circuit of a brake system of a vehicle in which the brake control device according to the present invention is incorporated.

Referring to FIG. 1A, the hydraulic circuit totally designated by 10 of a brake system of a vehicle not shown in the figure and having pairs of front and rear wheels also not shown in the figure comprises wheel cylinders 20FR, 20FL, 20RR and 20RL for applying braking forces to front light, front left, rear right and rear left ones of the wheels, respectively. The hydraulic circuit comprises a master cylinder 14 adapted to compress a brake fluid supplied from a reservoir 26 according to a depression of a brake pedal 12 by a driver, so as to deliver a pressurized brake fluid through passages 16 and 18 toward the wheel cylinders 20FL and 20FR, respectively.

On-off valves 22FL and 22FR are provided in the passages 16 and 18, respectively, so as normally not to obstruct communication of the passages 16 and 18, while to selectively interrupt the communication of the passages 16 and 18, respectively. Indeed, the on-off valves 22FL and 22FR are solenoid actuated valves which are maintained in a through open condition such as shown in the figure when no electric current is supplied thereto, while they are changed over to a position interrupting the communication of the passages 16 and 18, respectively, when they are selectively supplied with an electric current under a control of electric control means 52 described hereinbelow with respect to FIG. 1B when an ignition switch (not shown) is turned on, desirably on an additional condition that the voltage of a battery (not shown) of the vehicle is not lower than a normal threshold level.

34 is a pump adapted to be selectively driven by an electric motor 32 powered by the afore-mentioned battery via the electric control means 52, so as to pump up the brake fluid supplied from the reservoir 26 through a suction passage 28 for providing a pressurized source of the brake fluid in an outlet passage 29 branching to passages 36FR, 36FL, 36RR and 36RL for supplying the pressurized brake fluid to the wheel cylinders 20FR, 20FL, 20RR and 20RL through on-off valves 40FR, 40FL, 40RR and 40RL, respectively. An accumulator 31 may be connected to the outlet passage 29.

The on-off valves 40FR, 40FL, 40RR and 40RL are each of a normally closed type which maintains each of the supply passages 36FR, 36FL, 36RR and 3GRL in an interrupted condition when no electric current is supplied thereto, and is selectively opened by a supply of an actuating electric current thereto.

The wheel cylinders 20FR, 20FL, 20RR and 20RL are exhaustible through exhaust passages 38FR, 38FL, 38RR and 38RL including on-off valves 42FR, 42FL, 42RR and 42RL, respectively, toward an exhaust passage 30 leading to the reservoir 26. The on-off valves 42FR, 42FL, 42RR and 42RL are each also of a normally closed type which maintains each of the exhaust passages 38FR, 38FL, 38RR and 38RL in an interrupted condition when no electric current is supplied thereto, and is selectively opened by a supply of an actuating electric current.

As will be apparent from the foregoing descriptions, the wheel cylinders 20FR and 20FL of the front right and front left wheels are operative simply hydraulically by the hydraulic fluid compressed by the master cylinder 14 being supplied thereto through the normally open on-off valves 22FR and 22FL when the electric control means 52 are not being operated with the ignition switch turned off or the electric control means 52 were shut down for such reasons that the voltage of the battery has lowered below the normal threshold level as described before.

The pressures of the brake fluid in the wheel cylinders 20FR, 20FL, 20RR and 20RL are detected by pressure sensors 44FR, 44FL, 44RR and 44RL, respectively. The pressure of the brake fluid compressed by the master cylinder 14 is detected by a pressure sensor 48. The pressure of the brake fluid in the outlet passage 29 is detected by a pressure sensor 50.

Figure 1B:
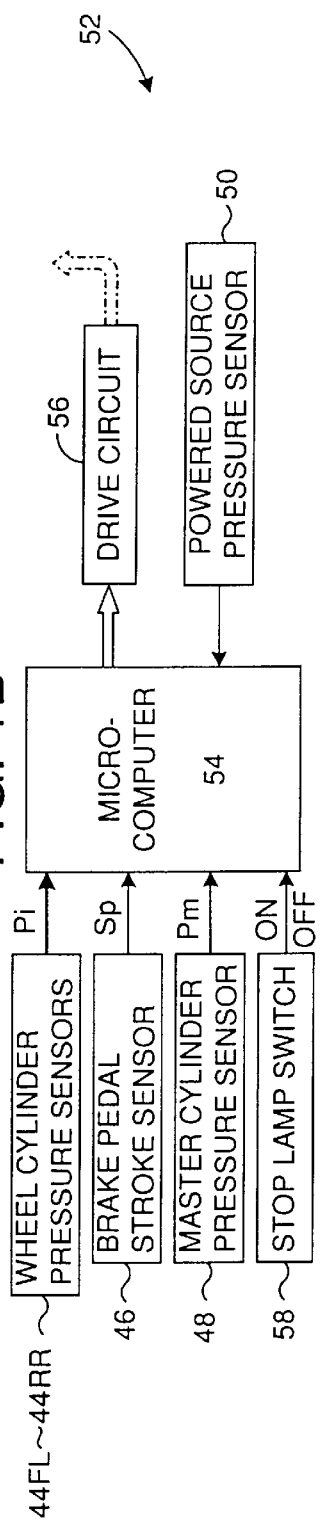
FIG. 1B is a diagram showing a basic construction of the brake control device according to the present invention.

The changeover of each of the on-off valves 22FR and 22FL, the on-off valves 40FR–40RL and the on-off valves 42FR–42RL is controlled by the electric control means 52 diagrammatically shown in FIG. 1B, or in more detail, by a microcomputer 54 thereof through a drive circuit 56 thereof. The microcomputer may be of a common type including a central processor unit (CPU), a read only memory (ROM), a random access memory (RAM), input and output port means and bi-lateral bus means interconnecting these elements, all not shown in detail in the figure.

The microcomputer 54 is supplied with signals of pressures Pi (i=fr, fl, rr and rl) of the brake fluid in the corresponding wheel cylinders from the wheel cylinder pressure sensors 44FL–44RR, a signal of depression stroke Sp of the brake pedal 12 by a driver from a brake pedal stroke sensor 46, a signal of master cylinder pressure Pm of the brake fluid compressed by the master cylinder 14 from the master cylinder pressure sensor 48, and the pressure of the brake fluid in the pump outlet passage 29 from the powered source pressure sensor 50, and carries out certain control calculations based upon the values of the parameters input by the signals from the sensors 44FL–44RR, 46, 48 and 50 for determining the pressure of the brake fluid to be established in each of the wheel cylinders 20FR–20RL at each moment of the operation of the vehicle as described in detail hereinunder, and controls the on-off valves 22FR and 22FL, 40FR–40RL and 42FR–42RL together with an on-off operation of the electric motor 32 via the drive circuit 56.

Figure 2:
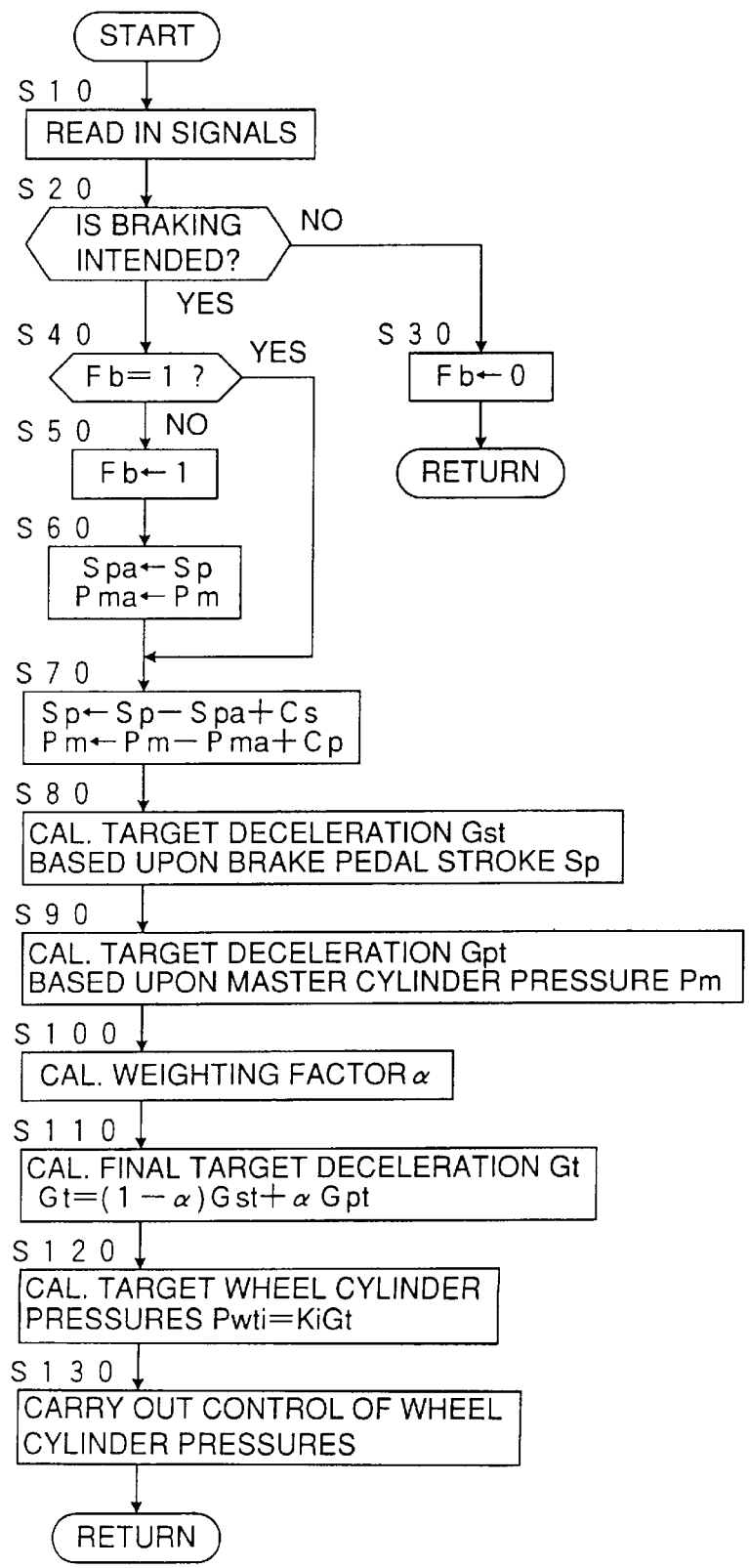
FIG. 2 is a flowchart showing an embodiment of the brake control device according to the present invention in the form of its control operation.

FIG. 2 shows an embodiment of the brake control device according to the present invention to be incorporated into a brake system of a vehicle such as shown in FIGS. 1A and 1B in the form of a flowchart showing its operation. As well known in the art, control operations such as shown by the flowchart of FIG. 2 are started upon a turning on of the ignition switch (not shown) and are carried out repetitively during the operation of the vehicle at a cycle time such as tens of microsecond so as to be able to follow quick changes of the operating conditions of the vehicle.

When the control operations are started, in step 10, signals from the sensors shown in FIG. 1B are read in.

In step 20, a judgment is made to determined if the semi-automatic brake system shown in FIGS. 1A and 1B is to be operated or not, i.e. if the driver is executing his or her intention for braking the vehicle positively through the brake pedal 12. This step is an essential point of the present invention. The detail will be described later with reference to FIG. 3. When the answer is no, the control proceeds to step 30, wherein a flag Fb is set to zero, and the control returns to step 10. When the answer is yes, the control proceeds to step 40.

In the meantime, the controls executed through steps 40–130 will be described. In these steps, steps 40–70 are particular to the present invention, while steps 80–130 are the same as steps 20–70 of the above-mentioned prior application Ser. No. 09/263,226.

In step 40, it is judged if the flag Fb is 1. The flag Fb is initialized to 0 every time when the control device is newly started, and is always reset to 0 when the control is returned through step 30. Therefore, in the first pass, Fb is 0, and the control proceeds to step 50, where Fb is set to 1.

In step 60, the value of the brake pedal depression stroke Sp detected at the moment by the brake stroke sensor 46 is stored as its initial value Spa, while at the same time, the value of the master cylinder pressure Pm detected by the master cylinder pressure sensor 48 is stored as its initial value Pma. As will be noted, when the control comes to step 40 in the continual second and subsequent passes, steps 50 and 60 are bypassed by the flag Fb being set to 1.

In step 70, the values of Sp and Pm detected by the brake pedal stroke sensors 46 and the master cylinder pressure sensor 48 are modified to be less as much as their initial values Spa and Pma, respectively. Or, further, as shown in FIG. 2, the values of Sp and Pm may further be modified by such constants as Cs and Cp, respectively, so as to adjust the effects of totally subtracting Spa or Pma. The effects of subtracting Spa and Pma from Sp and Pm, respectively, will be described later with reference to FIGS. 4 and 5.

Figure 8:
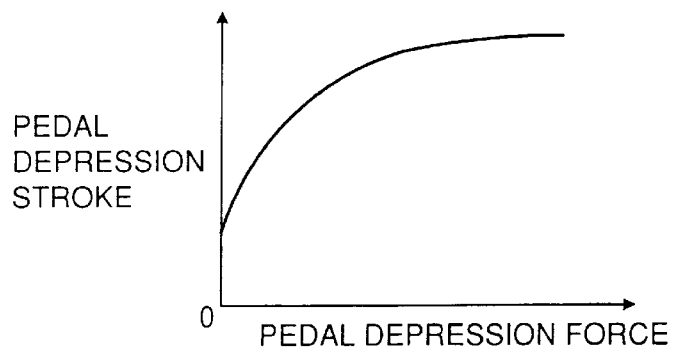
FIG. 8 is a graph showing a general performance of the brake pedal depression stroke vs. the brake pedal depression force.
Figure 9:
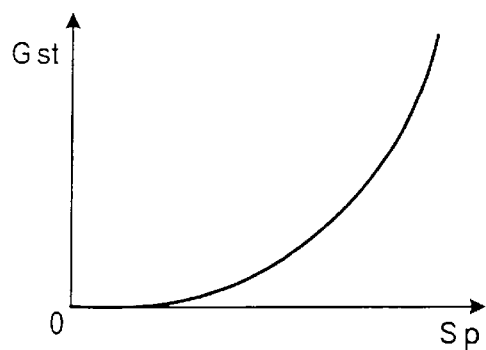
FIG. 9 is a graph showing an example of the performance of target deceleration Gst vs. brake pedal depression stroke Sp, i,e. a value of deceleration of the vehicle to be attained by the brake pedal being depressed to generate a corresponding value of the depression stroke.

In step 80, by looking up a map such as shown in FIG. 9 stored in the ROM of the microcomputer 54, a value of the target deceleration Gst is read out against a current value of the depression stroke Sp of the brake pedal by the driver, thereby estimating a driver's intention for a deceleration of the vehicle from the view point of the stroke of depression of the brake pedal by the driver. As will be appreciated from the shape of the performance curve shown in FIG. 9, the estimation of the deliver's intention for a deceleration of the vehicle against the depression stroke of the brake pedal is designed to reflect thereon the general relationship between the pedal depression stroke and the pedal depression force shown in FIG. 8. In other words, the steep inclination of the performance curve of FIG. 8 in the initial braking region is appropriately compensated for by inversely curving the shape of the performance curve of FIG. 9.

Figure 7:
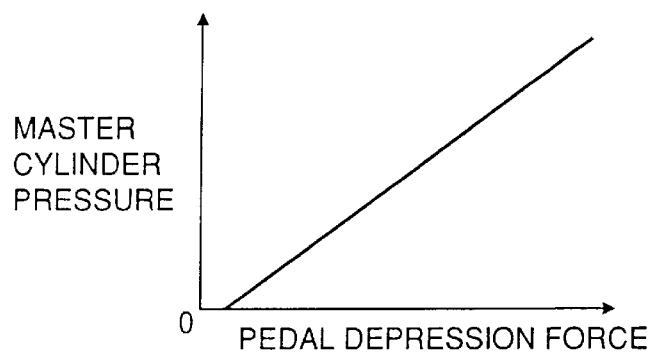
FIG. 7 is a graph showing a general performance of the master cylinder pressure vs. the brake pedal depression force.
Figure 10:
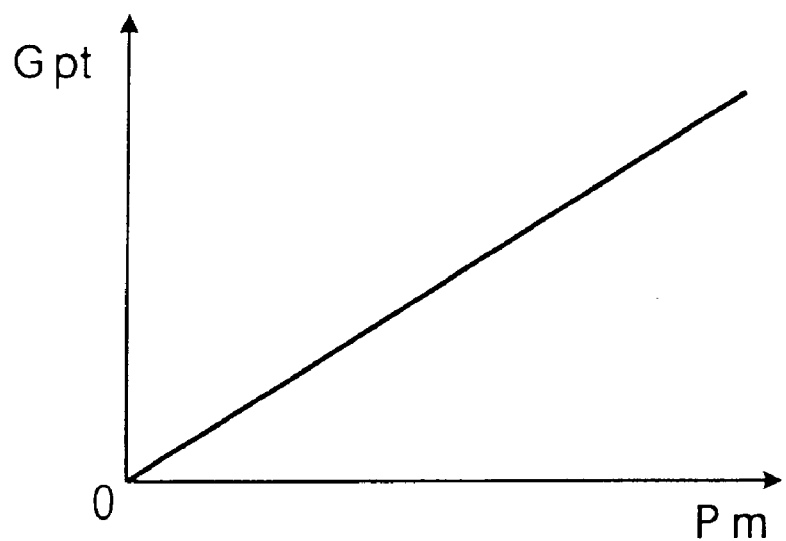
FIG. 10 is a graph showing an example of the performance of target deceleration Gpt vs. master cylinder pressure Pm, i,e. a value of deceleration of the vehicle to be attained by the brake pedal being depressed to generate a corresponding value of the master cylinder pressure.

In step 90, by looking up a map such as shown in FIG. 10 stored in the ROM, a value of the target deceleration Gpt is read out against a current value of the master cylinder pressure Pm, thereby estimating the driver's intention for a deceleration of the vehicle from the view point of the master cylinder pressure which is substantially proportional to the pedal depression force by the driver except the insensible initial region of the compression of the brake fluid as shown in FIG. 7.

Figure 11:
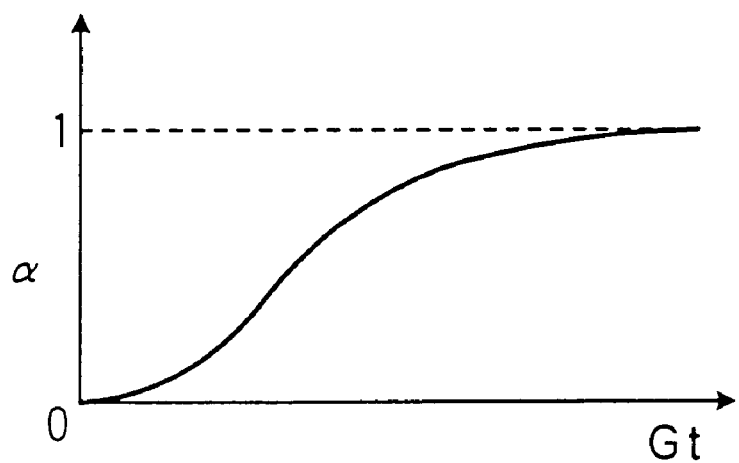
FIG. 11 is a graph showing an example of the performance of weighting factor α vs. final target deceleration Gt, i.e. a factor for weighting the target deceleration Gpt dependent on the master cylinder pressure in determining the braking force to be applied to the wheels according to a weighted combination of the target decelerations Gpt and Gst.

In step 100, by looking up a map such as shown in FIG. 11 stored in the ROM, a value of the weighting factor $\alpha$ for weighting the target deceleration Gpt based upon the master cylinder pressure Pm against the target deceleration Gst based upon the brake pedal depression stroke Sp is estimated against total target deceleration Gt which is a weighted sum of the target decelerations Gpt and Gst by the weighting factor $\alpha$ according to the following equation:

$$Gt=(1-\alpha)Gst+\alpha Gpt$$

In the brake control carried out according to the repetitive calculations of the steps 10–130 of FIG. 2, the reading out of the weighting factor $\alpha$ by the map of FIG. 11 is executed based upon the value of Gt obtained by each previous cycle of the calculations through the flowchart of FIG. 2.

As will be appreciated from the rightward upward sloping shape of the curve of FIG. 11, the weighting of the parameters in the estimation of the deceleration of the vehicle to be targeted at is gradually shifted from on the brake pedal depression stroke to on the master cylinder pressure along with increase of the target deceleration, i.e. as a higher braking force is applied to the wheels. Further, as will be appreciated in more detail from the shape of the curve of FIG. 11, the weighting factor $\alpha$ for the target deceleration Gpt based upon the master cylinder pressure may desirably be so determined that it is acceleratedly increased (in other words, $1-\alpha$ is acceleratedly decreased) along with increase of the total target deceleration Gt, i.e. the braking force to be targeted, when the total target deceleration Gt increases from zero to a certain medium value, so that the brake control based upon the brake pedal depression stroke is swiftly transferred to the brake control based upon the master cylinder pressure when the intensity of braking force increases out of the initial insensitive region in the performance of the master cylinder pressure against the brake pedal depression force as shown in FIG. 7, so as to ensure as soon as possible the linearity between the braking force applied to the wheels and the reaction force which the driver feels at his or her foot by the depression of the brake pedal, with a decelerated increase of the factor $\alpha$ along with further increase of the total target deceleration Gt following thereto for a corresponding compensation of the accelerated increase in the preceding region of increase.

In step 120, target wheel cylinder pressures Pwti (i=fr, fl, rr and rl) are calculated based upon the total target deceleration Gt by taking appropriate proportioning factors Ki, such as Pti=KiGt, possibly with further incorporation of other control calculations for vehicle stability control known in various ideas in the art of the computer control of automobiles.

In step 130, the microcomputer 54 outputs the control signals based upon the calculations in step 120 to the drive circuit 56 so that the motor 32, the on-off valves 22FR and 22FL, 40FR–40RL and 42FR–42RL are correspondingly operated to generate a corresponding braking force at each of the wheels.

Figure 3:
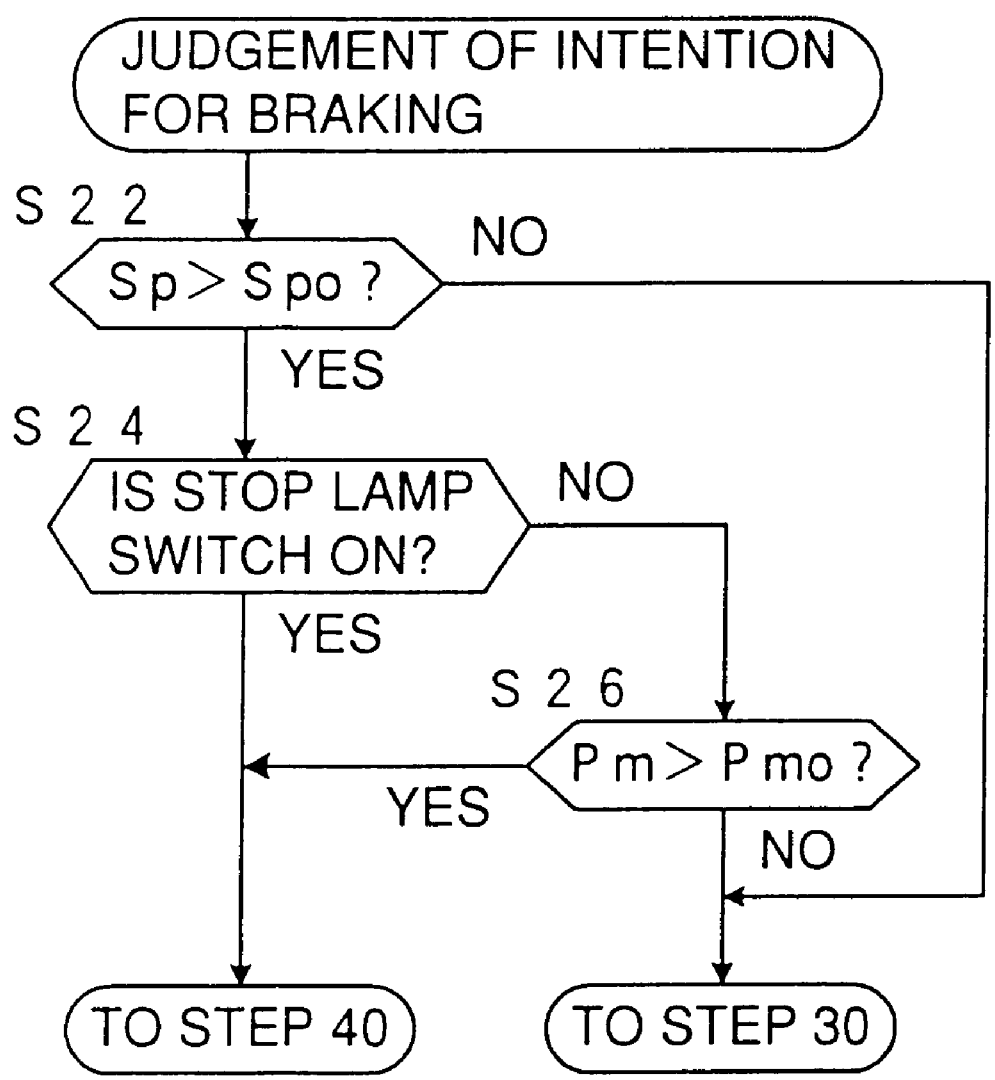
FIG. 3 is a flowchart showing an embodiment of the means for determining the brake system operation in the form of its operation.

Now, referring to FIG. 3 showing a subroutine corresponding to step 20 of FIG. 2, the process for determining the start of operation of the brake control device will be described.

In step 22, it is judged if the brake pedal depression stroke Sp detected by the brake pedal stroke sensor 46 is larger than a threshold value Spo predetermined therefor. The stroke value Spo is determined to be small enough to be able to detect any positive intention of the driver for braking the vehicle which he or she drives. The stroke value Spo may be determined to be so small that sometimes a noise for braking is picked up in spite of no positive braking intention of the driver but any positive braking intention of the driver is never missed, because, even if a noise is picked up, the positive judgment is confirmed in the next step as described hereinbelow. When the answer of step 22 is no, the control proceeds to step 30, and the motor powered brake system is not yet operated.

When the answer of step 22 turns into yes, the control proceeds to step 24, and it is judged if, as an embodiment, the stop lamp switch 58 is on. When the answer is yes, the control proceeds to step 40, and steps 40–130 are carried out as described with reference to FIG. 2. The device for the judgment in step 24 for which the stop lamp switch according to the conventional concept may be used (desirably as designed and manufactured to operate at a higher precision and firmness) may operate like a limit switch which only detects that the brake pedal was depressed at least for a predetermined stroke and need not be able to detect the stroke over a substantial range such as the brake pedal stroke sensor 46. Therefore, the precision and firmness of such a limit switch device will be readily enhanced without requiring any substantial cost increase. When the precision of such a limit switch device is high, its operating point can be set low enough never to fail to pick up any positive intention for braking of different divers, while decreasing the probability of picking up noises for useless starting of the operation of the brake system.

Thus, according to the double, more precise final checking, of the driver's positive intention for braking, the semi-automatic brake system of a digital construction such as shown in FIGS. 1A and 1B is definitely changed over to the operating condition only when it is really required.

When the answer of step 24 is no, the control proceeds to step 26, and it is judged if the master cylinder pressure Pm detected by the master cylinder pressure sensor 48 is larger than a threshold value Pmo predetermined therefor. When the answer of step 26 is no, the control proceeds to step 30, so that the semi-automatic brake system is not yet started for operation. However, when the answer is yes, the control proceeds to step 40. Indeed, however, since the judgment in step 24 is made based upon the depression stroke of the brake pedal at such a very initial stage of depression as described above, it will be only when a failure has occurred in the stop lamp switch 58 that the control proceeds from step 26 to step 40.

Figure 4A:
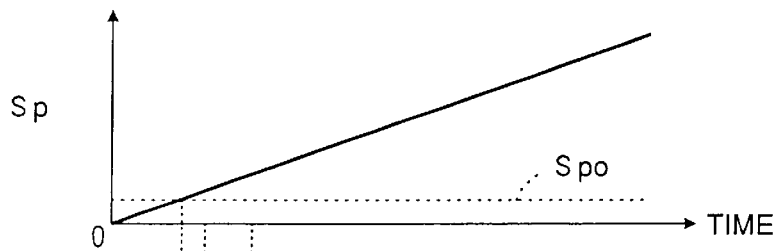
FIGS. 4A–4F are a set of graphs showing an example of the performances of parameters concerned with the shown embodiment of the brake control device.
Figure 4B:
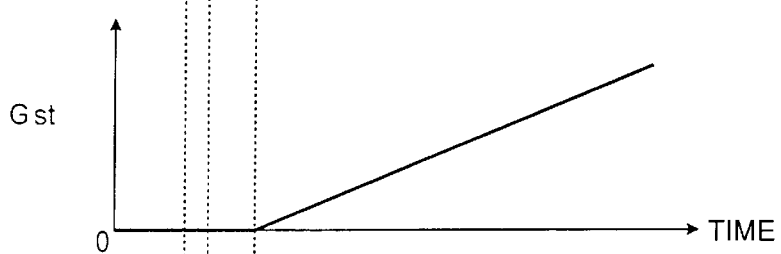
Figure 4C:
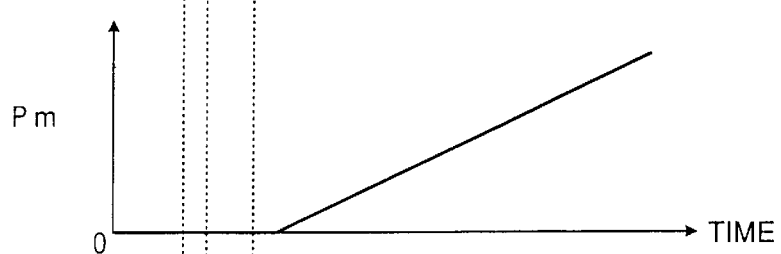
Figure 4D:
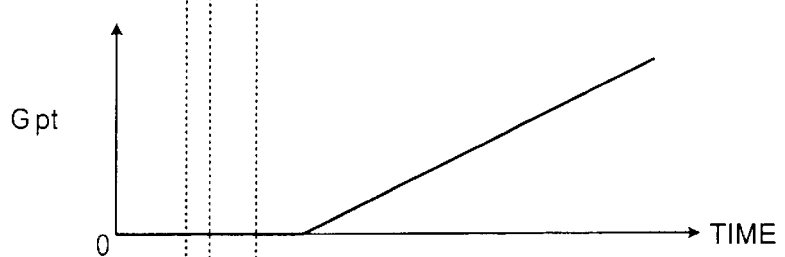
Figure 4E:
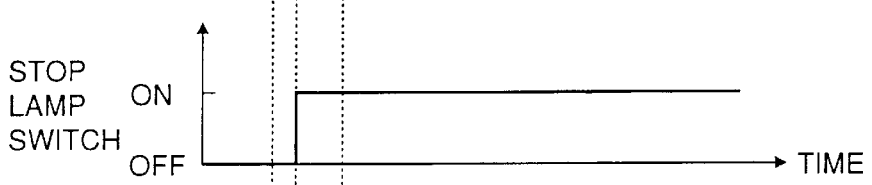
Figure 4F:
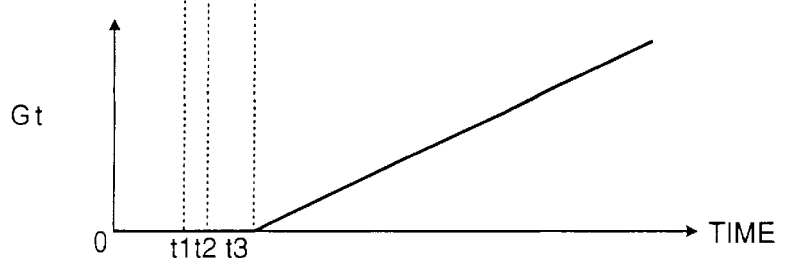

FIGS. 4A–4F are graphs showing an example of the operating performances of the brake system herein described. When it is assumed that the brake pedal is depressed in a normal gradual way, the pedal depression stroke Sp increases substantially uniformly according to the lapse of time as shown in FIG. 4A, and at time point t1, Sp attains the value of Spo, so that the answer of step 22 in FIG. 3 turns to yes. It is also assumed that the stop lamp switch 58 is set to be put on at time point t2 at which Sp increases to be a little higher than Spo as will be appreciated by aligning FIGS. 4A and 4E. Therefore, in such a normal operation, the control in FIG. 3 proceeds thereafter all vertically through steps 22 and 24. In this case, the target deceleration Gst read out against Sp according to the map of FIG. 9 starts to come out at time point t3 as shown in FIG. 4B, while the target deceleration Gpt read out against Pm according to the map of FIG. 10 starts to come out as somewhat delayed from Gst as shown in FIG. 4D. The value of Gt calculated in step 110 will increase as shown in FIG. 4F.

FIGS. 5A–5F are graphs similar to FIGS. 4A–4F, showing a case where the stop lamp switch 58 has failed. In this case, after time point t1, for the time being, the control of FIG. 3 circulates through steps 22, 24, 26 and 30, and when the time lapses to come to time point t4, the answer of the judgment in step 26 turns to yes, and then the control is shifted to proceeds to step 40. In this case, Gst and Gpt, when read out against Sp and Pm as started at time point t4, will respectively show an abrupt increase at time point t4 such that the total target deceleration Gt will show such a performance as shown by a broken line in FIG. 5F, causing an abrupt braking shock in the vehicle.

In order to avoid such a problem, steps 40–70 are provided in the process shown in FIG. 2. According to these steps, even when the control first proceeds through steps 80–130 after a substantial time has lapsed from time point t1, in the first pass through steps 40–70, the scales of Sp and Pm are biased to become smaller as much as the valued thereof at time point t4, so that Gst and Gpt are read out always starting from zero, so that the total target deceleration Gt increases as shown by a solid line in FIG. 5F, provided that Cs and Cp are both zero.

Such a solid line performance of Gt may be modified as shown by a dot-dash line in FIG. 5F by an appropriate adjustment of adding the constants Cs and Cp in step 70 of FIG. 2, so as not to decrease much the total target deceleration Gt within a rage of avoiding an abrupt braking shock, or, although not shown by steps, the solid line performance of Gt may be modified as shown by a phantom line in FIG. 5F by an appropriate proportioning factor being multiplied to Sp and Pm calculated in step 70 of FIG. 2.

Figure 6:
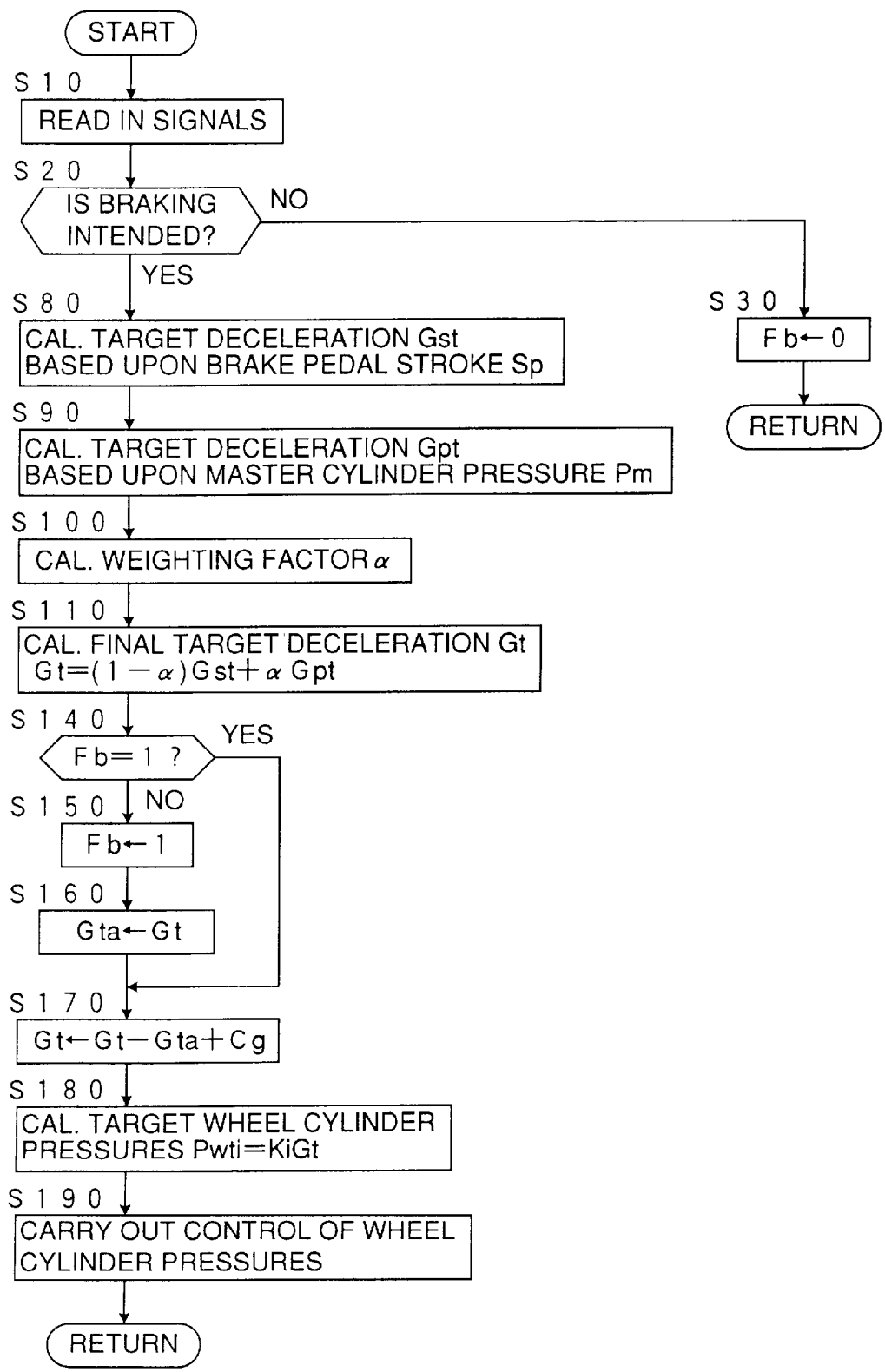
FIG. 6 is a flowchart similar to that of FIG. 2, showing a modification of a part of the embodiment of FIG. 2.

FIG. 6 shows a flowchart similar to that of FIG. 2, modified from the process of FIG. 2 with regard to avoiding the abrupt increase of the target deceleration Gt when the brake system is substantially actuated at time point t4 of FIGS. 5A–5F due to a failure of the stop lamp switch 58. In FIG. 6, the steps corresponding to those shown in FIG. 2 are designated by the same step numbers as in FIG. 2 and operate in the same way as in FIG. 2. In this modification, the abrupt increase of Gt at time point t4 is avoided by the value of Gt calculated through steps 80–110 is biased to become smaller as much as an initial value Gta at the moment when the control flows first through steps 80–110 by steps 140–170, as the functions of these steps will be apparent. Also in this modification, an appropriate constant Cg may be used to shift a performance such as shown by the solid line in FIG. 5F to the performance of the dot-dash line, or, although not shown by steps, an appropriate multiplying factor may be applied to the biased Gt so that its performance is modified as shown by the phantom line.

Although the invention has been described in detail with respect to a preferred embodiment thereof, it will be apparent for those skilled in the art that modifications are possible within the scope of the present invention.

What is claimed is:

1. A brake control device of a vehicle having wheels and a brake system for the wheels including wheel cylinders for applying a braking force to each corresponding one of the wheels according to a supply of a pressurized brake fluid thereto, a brake pedal adapted to be depressed by a driver, a master cylinder adapted to generate a master cylinder pressure which increases along with an increase of a depression of the brake pedal by the driver, a motor powered pump for pressurizing the brake fluid, and control means for selectively supplying the brake fluid pressurized by the pump to at least a selected one of the wheel cylinders according to the depression of the brake pedal by the driver, the brake control device comprising:

first means for detecting the depression to exceed a first threshold value determined therefor;

second means for detecting the depression to exceed a second threshold value determined therefor to be larger than the first threshold value;

third means for calculating a target pressure of the brake fluid to be supplied to the selected one wheel cylinder based upon the brake fluid pressurized by the pump according to the depression;

fourth means for storing a value of the depression either at a moment when the first means detects for a first time the depression exceeding the first threshold value or at a moment when the second means detects for a first time the depression exceeding the second threshold value with the first means failing to detect the depression exceeding the first threshold value; and fifth means for controlling the fluid pressure supplied to the selected one wheel cylinder at each successive moment according to the depression at the successive moment to be a pressure value of the target pressure calculated by the third means at the successive moment for a depression value smaller than a momentary value of the depression at the successive moment substantially as much as the depression value stored in the fourth means.

2. The brake control device according to claim 1, wherein the first means detects the depression to exceed the first threshold value by a stroke value of the depression exceeding a threshold value determined therefor, and the second means detects the depression to exceed the second threshold value by a pressure value of the master cylinder pressure exceeding a threshold value determined therefor.

3. A brake control device of a vehicle having wheels and a brake system for the wheels including wheel cylinders for applying a braking force to each corresponding one of the wheels according to a supply of a pressurized brake fluid thereto, a brake pedal adapted to be depressed by a driver, a master cylinder adapted to generate a master cylinder pressure which increases along with an increase of a depression of the brake pedal by the driver, a motor powered pump for pressurizing the brake fluid, and control means for selectively supplying the brake fluid pressurized by the pump to at least a selected one of the wheel cylinders according to the depression of the brake pedal by the driver, the brake control device comprising:

first means for detecting the depression to exceed a first threshold value determined therefor, second means for detecting the depression to exceed a second threshold value determined therefor to be larger than the first threshold value;

third means for calculating a target pressure of the brake fluid to be supplied to the selected one wheel cylinder based upon the brake fluid pressurized by the pump according to the depression;

fourth means for storing a value of the target pressure either at a moment when the first means detects for a first time the depression exceeding the first threshold value or at a moment when the second means detects for a first time the depression exceeding the second threshold value with the first means failing to detect the depression exceeding the first threshold value; and fifth means for controlling the fluid pressure supplied to the selected one wheel cylinder at each successive moment according to the depression at the successive moment to be a pressure value lower than a momentary value of the target pressure calculated by the third means for the successive moment substantially as much as the target pressure value stored in the fourth means.

4. The brake control device according to claim 3, wherein the first means detects the depression to exceed the first threshold value by a stroke value of the depression exceeding a threshold value determined therefor, and the second means detects the depression to exceed the second threshold value by a pressure value of the master cylinder pressure exceeding a threshold value determined therefor.

* * * * *